(12) United States Patent
Faccin et al.

(10) Patent No.: US 9,763,134 B2
(45) Date of Patent: Sep. 12, 2017

(54) MECHANISM TO LIMIT SIGNALING STORMS OVER A NETWORK

(71) Applicant: QUALCOMM Incorporated, San Diego, CA (US)

(72) Inventors: Stefano Faccin, Hayward, CA (US); Arnaud Meylan, San Diego, CA (US); Gerardo Giaretta, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 197 days.

(21) Appl. No.: 14/203,194

(22) Filed: Mar. 10, 2014

(65) Prior Publication Data

US 2014/0293780 A1    Oct. 2, 2014

Related U.S. Application Data

(60) Provisional application No. 61/805,885, filed on Mar. 27, 2013.

(51) Int. Cl.
| | | |
|---|---|---|
| *G01R 31/08* | (2006.01) | |
| *H04W 28/02* | (2009.01) | |
| *H04W 12/06* | (2009.01) | |
| *H04W 48/06* | (2009.01) | |
| *H04W 48/16* | (2009.01) | |

(52) U.S. Cl.
CPC ....... *H04W 28/0289* (2013.01); *H04W 12/06* (2013.01); *H04W 28/02* (2013.01); *H04W 28/0205* (2013.01); *H04W 48/06* (2013.01); *H04W 48/16* (2013.01)

(58) Field of Classification Search
CPC . H04W 48/14; H04W 28/0289; H04W 48/16; H04W 28/0205

USPC ......................................................... 370/230
See application file for complete search history.

(56) References Cited

U.S. PATENT DOCUMENTS

| | | | | |
|---|---|---|---|---|
| 2007/0274211 A1* | 11/2007 | Tsubota | ............ | H04W 76/064 370/229 |
| 2008/0170497 A1* | 7/2008 | Jeong | ................ | H04W 28/08 370/230 |
| 2009/0252099 A1* | 10/2009 | Black | ................ | H04W 72/085 370/329 |
| 2010/0061232 A1 | 3/2010 | Zhou et al. | | |
| 2011/0096737 A1* | 4/2011 | Venkatachalam | ..... | H04W 12/06 370/329 |
| 2011/0280229 A1 | 11/2011 | Montemurro et al. | | |
| 2012/0231828 A1* | 9/2012 | Wang | ................ | H04W 74/04 455/509 |

(Continued)

FOREIGN PATENT DOCUMENTS

| | | |
|---|---|---|
| CN | 102316549 A | 1/2012 |
| WO | 2012139075 A1 | 10/2012 |

OTHER PUBLICATIONS

Taiwan Search Report—TW103111074—TIPO—Aug. 25, 2015.

(Continued)

*Primary Examiner* — Gerald Smarth
(74) *Attorney, Agent, or Firm* — Arent Fox LLP (57) ABSTRACT

Methods performed by a user equipment (UE) for wireless communication, the method comprising receiving an authentication load indicator from an access point (AP), and determining whether to attempt authentication with a network entity based at least in part on the authentication load indicator.

23 Claims, 7 Drawing Sheets

(56) References Cited

U.S. PATENT DOCUMENTS

2012/0311686 A1    12/2012    Medina et al.
2013/0070739 A1*    3/2013    McCann ............... H04W 48/16
                                                                                                                    370/338
2013/0072248 A1    3/2013    Bajko

OTHER PUBLICATIONS

International Search Report and Written Opinion—PCT/US2014/023347—ISA/EPO—Oct. 7, 2014.
Liu Y., et al., "Security Analysis and Improvements of IEEE802.11u," Dec. 21, 2012, Retrieved from the Internet: URL:http://www.hpl.hp.comjtechreports/2012/HPL-2012-243.pdf, 9 Pages, XP055143372.
Partial International Search Report—PCT/US2014/023347—ISA/EPO—Jul. 31, 2014.

* cited by examiner

FIG. 1A

| Test Case | AP | AP Controller | WLAN Gateway | WiFi AAA | Wi-Fi Roaming Hub | Cellular/HSP AAA | Cellular HLR |
|---|---|---|---|---|---|---|---|
| 1 | L3->L3 | | Same | Same | Same/NA* | Same | Same/NA* |
| 2 | L3->L2 | | Change | Same | Same/NA* | Same | Same/NA* |
| 3 | L2->L2 | | Same | Same | Same/NA* | Same | Same/NA* |
| 4 | L2->L2 | | Change | Same | Same/NA* | Same | Same/NA* |
| 5 | L2-LWAP | Arrive | Change | Same | Same/NA* | Same | Same/NA* |
| 6 | LWAP->L2 | Depart | Change | Same | Same/NA* | Same | Same/NA* |
| 7 | LWAP->L3 | Depart | Same | Same | Same/NA* | Same | Same/NA* |
| 8 | LWAP->LWAP | Same | Same | Same | Same/NA* | Same | Same/NA* |
| 9 | LWAP->LWAP | Change | Change | Same | Same/NA* | Same | Same/NA* |
| 10 | LWAP->LWAP | Change | Change | Same | Same/NA* | Same | Same/NA* |
| 11 | LWAP-LWAP | Change | Change | Change | Change | Same | Same/NA* |

MECHANISM TO LIMIT SIGNALING STORMS OVER A NETWORK

CROSS REFERENCE TO RELATED APPLICATION

The present application for patent claims priority to commonly owned U.S. Provisional Application No. 61/805,885 entitled "Mechanism to Limit Signaling Storms Over A Network" filed Mar. 27, 2013, the disclosures of which are hereby expressly incorporated by reference herein.

BACKGROUND

Field

Aspects of the present disclosure relate generally to wireless communication systems, and more particularly, to techniques for limiting signal storms over a network.

Background

Hotspots allow user equipment (UEs) to access a network via access points (APs) distributed over a geographic area. APs may employ WiFi technology to wirelessly communicate with UEs. Conventionally, user intervention is required for a UE to gain network access via a hotspot. For example, the UE may detect a hotspot and ask the user whether to connect to the detected hotspot. In this case, the user is required to make a decision whether to connect the UE to the hotspot. In addition, the user may be required to provide credentials (e.g., username and/or password) to authenticate to a network via the hotspot to gain network access.

Hotspot 2.0 from the WiFi Alliance is a technology that allows a UE to automatically select a hotspot and automatically authenticate the UE to a network via the hotspot to gain network access. However, the current implementation of Hotspot 2.0 may lead to a large amount of signaling traffic at key network nodes (e.g., an AP, an access controller (AC), an Authentication, Authorization and Accounting (AAA) server, etc.). This has the potential of overloading these network nodes, causing these network nodes not to function correctly and consequently to block or deny access to legitimate authentication requests from other UEs.

SUMMARY OF THE INVENTION

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include concurrent communication over multiple air interfaces.

A method performed by a user equipment (UE) for wireless communication, the method comprising receiving an authentication load indicator from an access point (AP), and determining whether to attempt authentication with a network entity based at least in part on the authentication load indicator.

An apparatus for wireless communication comprising means for receiving an authentication load indicator from an access point (AP), and means for determining whether to attempt authentication with a network entity based at least in part on the authentication load indicator.

An apparatus for wireless communication comprising a receiver configured to receive an authentication load indicator from an access point (AP), at least one processor configured to determine whether to attempt authentication with a network entity based at least in part on the authentication load indicator, and a memory coupled to the at least one processor for storing data.

A method performed by a UE for wireless communication, the method comprising listening for a message transmitted by an access point (AP) in response to a query from another UE for a first time period, and determining whether the message includes information needed by the UE to perform authentication with a network entity if the UE receives the message within the first time period.

An apparatus for wireless communication comprising means for listening for a message transmitted by an access point (AP) in response to a query from another apparatus for a first time period, and means for determining whether the message includes information needed by the apparatus to perform authentication with a network entity if the apparatus receives the message within the first time period.

An apparatus for wireless communication comprising a receiver configured to listen for a message transmitted by an access point (AP) in response to a query from another apparatus for a first time period, at least one processor configured to determine whether the message includes information needed by the apparatus to perform authentication with a network entity if the apparatus receives the message within the first time period, and a memory coupled to the at least one processor for storing data.

A method performed by a network entity for wireless communication, the method comprising receiving a query for network information from a UE, and transmitting a message in response to the query, wherein the message is receivable by a plurality of UEs and the message includes at least one of a query load indicator, an authentication load indicator and a retry indicator.

An apparatus for wireless communication comprising means for receiving a query for network information from a UE, and means for transmitting a message in response to the query, wherein the message is receivable by a plurality of UEs and the message includes at least one of a query load indicator, an authentication load indicator and a retry indicator.

An apparatus for wireless communication comprising a receiver configured to receive a query for network information from a UE, at least one processor configured to generate a message in response to the query, wherein the message includes at least one of a query load indicator, an authentication load indicator and a retry indicator. The apparatus further comprising a transmitter configured to transmit the message, wherein the message is receivable by a plurality of UEs, and a memory coupled to the at least one processor for storing data.

A computer program product, comprising a non-transitory computer-readable medium comprising code for causing a computer to receive an authentication load indicator from an access point (AP), and determine whether to attempt authentication with a network entity based at least in part on the authentication load indicator.

A computer program product, comprising a non-transitory computer-readable medium comprising code for causing a computer to listen for a message transmitted by an access point (AP) in response to a query from another UE for a first time period, and determine whether the message includes information needed by the UE to perform authentication with a network entity if the UE receives the message within the first time period.

A computer program product, comprising a non-transitory computer-readable medium comprising code for causing a computer to receive a query for network information from a UE, and transmit a message in response to the query, wherein the message is receivable by a plurality of UEs and the message includes at least one of a query load indicator, an authentication load indicator and a retry indicator.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

With the advent of the Passpoint program (WFA Hotspot 2.0) from the Wi-Fi Alliance there will be a change in how devices authenticate to Wi-Fi networks. Devices will use authentication based on their SIM cards. A device will carry out authentication seamlessly with no input required from the user, whereas at present authentication to public hotspots using other forms of credentials (e.g. username and password) require explicit user input.

Under some circumstances this may lead to a large amount of signaling traffic at some key network nodes. This has the potential to cause these network nodes to not be able to function correctly and consequently block or deny access to legitimate authentication requests from other UEs, with the potential for users to be denied network access. There are at least three cases in which the current implementation of Hotspot 2.0 has the potential to create large amounts of signaling traffic under certain circumstances:
1. Community Wi-Fi Deployment
2. Public Transport Hub-Metro or Rail Station
3. Sports Stadium In the community Wi-Fi deployment case, a Hotspot 2.0 certified UE in a car stops at a red traffic light and detects a Hotspot 2.0 AP. The UE automatically authenticates to the AP. The traffic light then changes to green and the car and UE move down the road to the next red traffic light. The UE discovers a different Hotspot 2.0 AP, and the UE automatically authenticates to the new AP. In cities a block of flats will normally have a high density number of APs, and this may cause many signaling requests as the UE moves about near a building. It is very likely that there will be several cars in the same traffic queue all with Hotspot 2.0 UEs. Adding in the number of traffic lights in a big city, and also adding in the number of Hotspot 2.0 APs (many thousands), then it can easily be seen that this will result in a large number of authentication requests being initiated into the network. However it is likely that the UEs are not being used as they are in the driver's or passenger's pocket, but they will still attempt to authenticate to the visible APs. Unlike UEs in cars, a pedestrian's UE that is entering in the Hotspot 2.0 AP coverage should not be retained long from accessing the Hotspot 2.0 AP.

In the public transport hub case, a metro network typically has many stations and often in a typical deployment there is Wi-Fi coverage in stations but not the tunnels. Typically, particularly during rush hour, metro trains can arrive every 1 to 2 minutes with several hundred passengers on board. There will be a large number of Hotspot 2.0 UEs on the train. All these UEs detect the Hotspot 2.0 APs in the station and all these UEs automatically initiate authentication and access requests towards the network. This creates many separate authentication requests, and when this is multiplied by the number of trains and stations in a network, it can be seen that a large number of authentication and access requests can be created in a network during a short period. Similar situations can occur in a surface rail network and other transport hubs. Unlike UEs in the train, a pedestrian's UE that is entering into the station Wi-Fi coverage should not be retained long from accessing the station Wi-Fi APs.

In the sports stadium case, a sports stadium is enabled with multiple Hotspot 2.0 APs. Many thousands of Hotspot 2.0 UEs are present in the stadium that are brought in by spectators. A spectator that is not using his/her UE gets up and goes to buy a snack. En route they could pass several different APs, creating many separate authentication requests. At the interval of many people all moving all at once, this also could result in a large number of authentication requests. However, many of the UEs may not be in use as the spectator moves around the stadium.

Embodiments of the present disclosure address these and additional problems with the current implementation of Hotspot 2.0, as discussed further below.

Figure 1A:
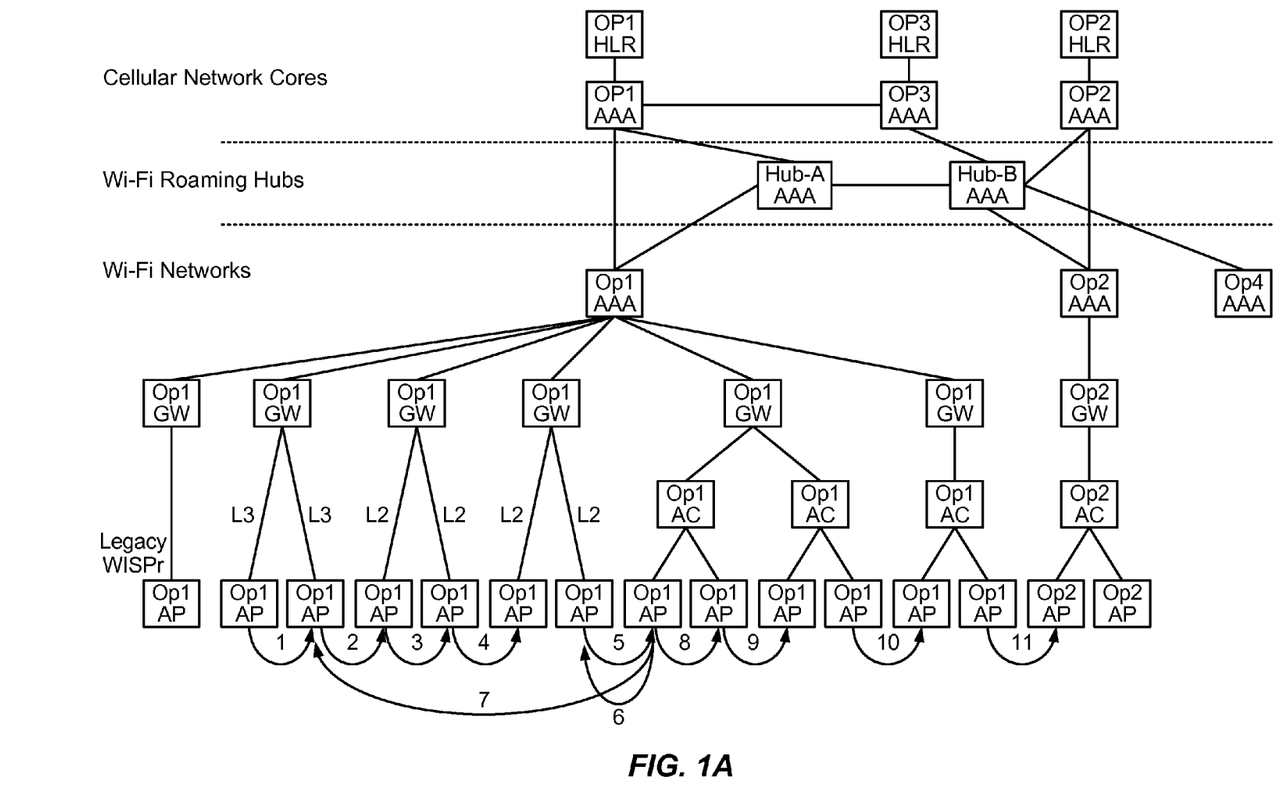
FIG. 1A shows examples of network architectures, in which embodiments of the present disclosure may be implemented.
Figure 1B:
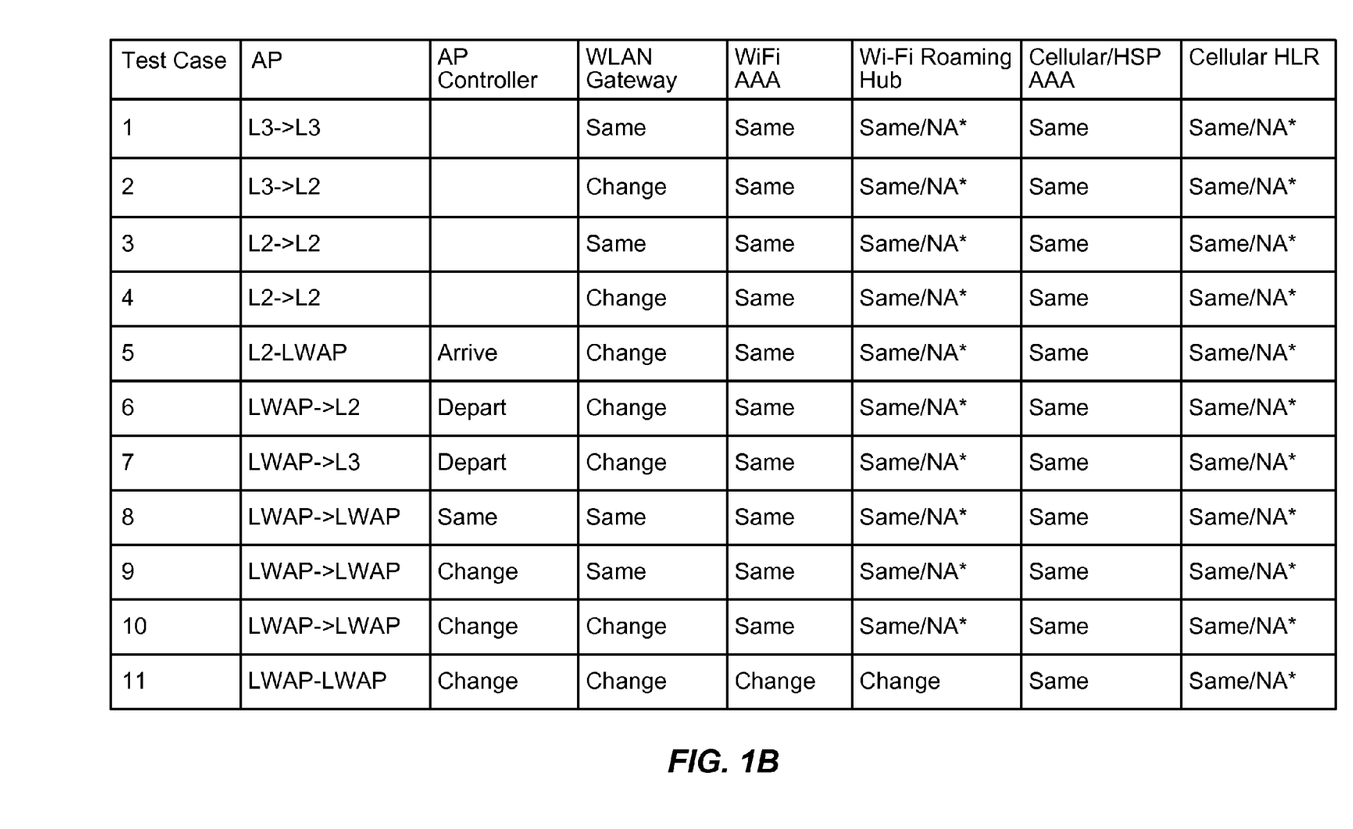
FIG. 1B is a table showing changes in network connections when a UE moves between access points (APs) shown in FIG. 1A.

FIG. 1A shows examples of network architectures, in which embodiments of the present disclosure may be implemented. Other architectures are also possible. Note that FIG. 1A only depicts connections involved in authentication. FIG. 1A depicts WiFi access points (APs), which may be distributed over a geographic area to provide UEs with wireless coverage. FIG. 1A also depicts access controllers (ACs), where each AC may manage a group of APs. FIG. 1A also depicts operator gateways (GWs) and Authentication, Authorization and Accounting (AAA) servers. Each GW connects APs and/or ACs to one of the AAA servers. Each AAA server may authenticate UEs requesting access to the respective operator network. FIG. 1A also depicts Home Location Registers (HLRs) that store subscriber information for the respective operator network. FIG. 1B is a table showing examples of changes in network connections when a UE moves between APs shown in FIG. 1A.

Figure 2:
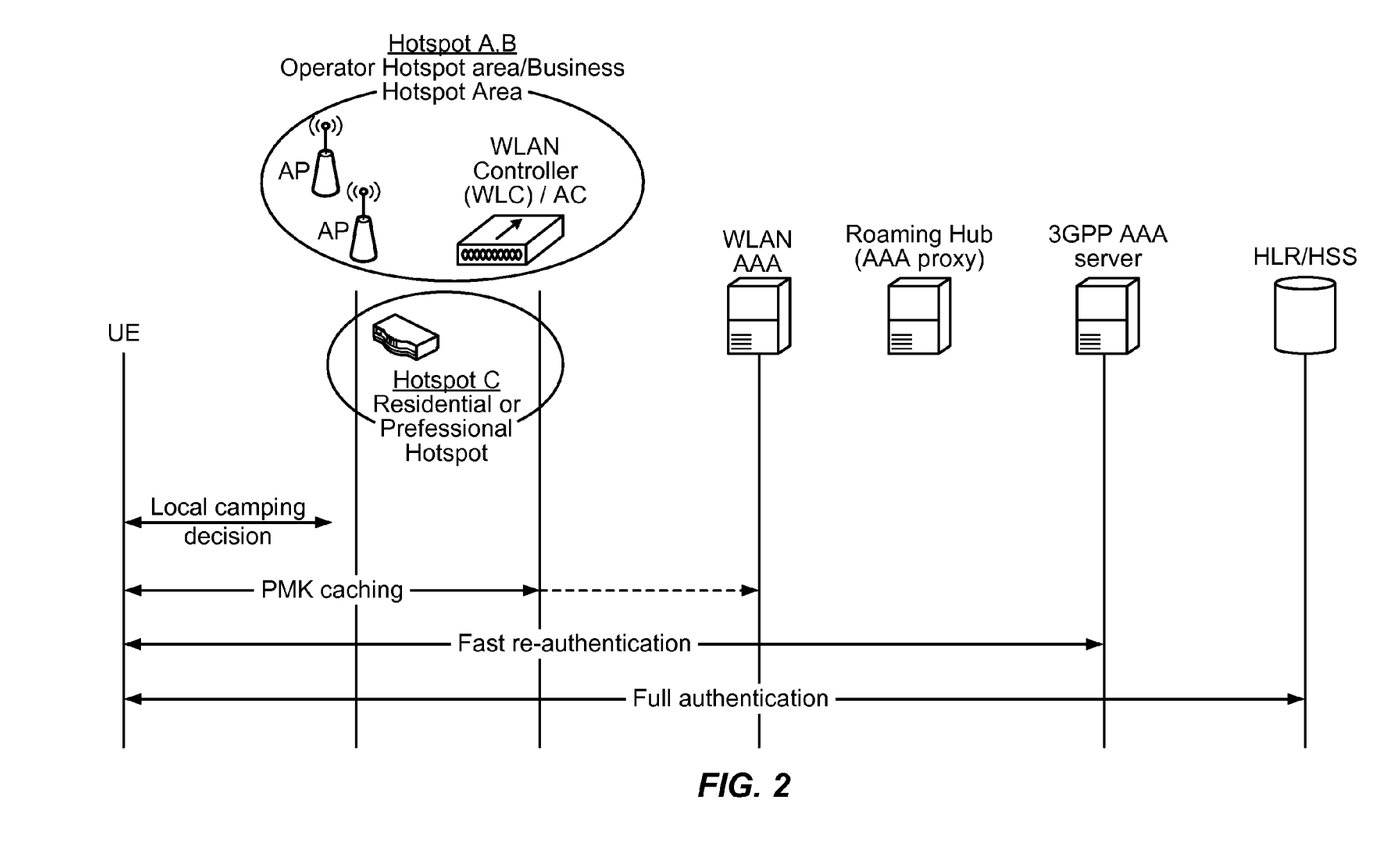
FIG. 2 shows an example of an architecture, in which embodiments of the present disclosure may be implemented.

FIG. 2 shows an example of an architecture, in which embodiments of the present disclosure may be implemented.

FIG. 2 depicts a local camping decision in which a UE makes a decision whether to connect to an AP. The AP may be a residential AP operated by a residential user or a professional AP operated by a business. The UE may make a decision whether to connect to an AP based on a beacon and/or Access Network Query Protocol (ANQP) response transmitted by the AP, as discussed further below. FIG. 2 also depicts a full authentication and a fast re-authentication. Full authentication may be performed when a UE is first authenticated to a network and fast re-authentication may be performed when the UE is re-authenticated to the network (e.g., when the UE reconnects to the network after losing a connection with the network). As shown in FIG. 2, fast re-authentication involves fewer network nodes than full authentication. FIG. 2 also depicts Pairwise Master Key (PMK) caching, in which security material from a prior authentication is used to perform local authentication.

Some networks nodes can be considered as more operational critical and so should be prioritized as requiring protection from signaling overload. A potential cost could be considered by using the following indicators, not in any order:
Number of affected users
Loss of revenue
Publicity/embarrassment of a failure Taking this into account it is possible to rank the nodes into an order of protection where the failure of a node would have the most impact. For example, this order may be:
1. HLR/HSS
2. 3GPP AAA
3. WLAN AAA
4. WLC or WLAN GW
5. AP Embodiments of the present disclosure may be used to protect the AP, the WLC (WLAN AC Access Controller) or WLAN GW (e.g. a TWAG in the 3GPP SaMOG architecture), and the WLAN AAA. The impact on these nodes may include:
WLAN AAA: No access for WLAN users on Home network for devices not already authenticated
WLAN/GW: No access for all WLAN users
AP: No WLAN access for users on affected AP Hotspot 2.0 supports an Access Network Query Protocol (ANQP) that allows UEs to discover network information associated with an AP. When a UE discovers an AP (e.g., by detecting a beacon transmitted by the AP), the UE automatically sends an ANQP query to the AP for network information associated with the AP. In response, the AP transmits an ANQP response with the network information. The network information may include information about the features/capabilities supported by the AP including a list of service providers (e.g., roaming partners) that are accessible via the AP. Upon receiving the ANQP response, the UE may determine whether a service provider to which the UE has credentials matches one of the service providers listed in the ANQP response. If there is a match, the UE automatically authenticates to the matching service provider via the AP to gain network access.

In some cases, the UE may have credentials for two or more service providers. These service providers may be assigned different priorities, in which a service provider with a higher priority is preferred over a service provider with a lower priority. In these cases, if more than two of these service providers match service providers listed in an ANQP response, the UE selects the matching service provider with the highest priority.

An ANQP query from a UE may inquire whether one or more specific service providers are accessible via the AP. In this case, the corresponding ANQP response may indicate, for each of these service providers, whether the service provider is accessible via the AP, instead of listing all of the service providers that are accessible via the AP. This may have the advantage of shorting the ANQP response.

As discussed above, in the current implementation, a UE automatically sends an ANQP query to an AP upon discovering the AP. This can create excessive ANQP traffic at an AP in certain situations, and therefore potentially overload the AP and/or take away valuable bandwidth from user data. For example, an AP may be deployed in a subway station. In this example, a train may pull into the station carrying a large number of users with Hotspot 2.0 enabled UEs. These UEs may discover the AP as the train pulls into the station and send a large number of ANQP queries to the AP within a short period of time, creating a large amount of ANQP traffic. There are other situations in which the current ANQP implementation can lead to excessive ANQP traffic at an AP. Currently, the AP cannot protect itself from excessive ANQP traffic, and simply rejects a number of users when the ANQP traffic becomes too high.

Accordingly, embodiments of the present disclosure provide solutions for controlling the ANQP traffic. In one embodiment, a UE does not immediately send an ANQP query to an AP upon discovering the AP. Instead, the UE listens for an ANQP response transmitted by the AP in response to an ANQP query from another UE for a time period (e.g., a few seconds).

If the UE receives an ANQP response within the time period, then the UE examines the ANQP response to determine whether the ANQP response includes network information needed by the UE to access a network via the AP. For example, the UE may examine the ANQP response to determine whether the ANQP lists a service provider for which the UE has credentials. If the ANQP response includes the needed information, then the UE may proceed with authenticating to the network via the AP based on the information without sending its own ANQP query.

If the ANQP response does not include the needed information, then the UE may continue to listen for another ANQP response within the time period. For example, the ANQP response may indicate whether a specific service provider identified by the ANQP query from the other UE is accessible via the AP instead of listing all of the service providers that are accessible via the AP. In this example, if the identified service provider does not match a service provider for which the UE has credentials, then the UE may continue to listen for another ANQP. If the UE receives another ANQP within the time period, then the UE may examine the other ANQP to determine whether the other ANQP includes the needed information. If the other ANQP includes the needed information, then the UE may proceed with authenticating to the network via the AP without sending its own ANQP query. Otherwise, the UE may continue listening until the time period expires.

If the UE does not receive an ANQP response within the time period or does not receive an ANQP response with the needed information within the time period, then the UE may send an ANQP query to the AP, and receive an ANQP response in response to the ANQP query.

Thus, instead of immediately sending an ANQP query upon discovering an AP, the UE listens for an ANQP response transmitted in response to an ANQP query from another UE for a time period. If the UE is able to get the information it needs from an ANQP response transmitted in response to an ANQP query from another UE, then the UE does not send a separate ANQP query. This reduces the ANQP traffic at the AP by reducing the number of ANQP queries sent to the AP.

The AP may transmit an ANQP response on a common channel that is shared by many UEs. This allows many UEs to listen for and receive an ANQP response transmitted by the AP in response to an ANQP query from one UE. This reduces ANQP traffic by allowing multiple UEs to receive network information from the same ANQP response without having to send separate ANQP queries to the AP.

In some embodiments, an ANQP response may be augmented to include additional information that can be used to control ANQP traffic. In one embodiment, an ANQP response may include an ANQP load indicator indicating an ANQP load at the respective AP. The AP may calculate the ANQP load based on the amount of ANQP traffic at the AP (e.g., based on a number of ANQP queries sent to the AP and/or number of ANQP responses transmitted by the AP). The ANQP load indicator may be a binary indicator (e.g., in which a one indicates a high ANQP load and a zero indicates a low ANQP load). Alternatively, the ANQP load may be a load value (e.g., a value between one and ten).

An ANQP response may also include an ANQP retry indicator that indicates to a UE how long to back off sending an ANQP query to an AP when the ANQP load is high. The ANQP retry indicator may be a timer value or a seed value that a UE uses to calculate a timer value, as discussed further below. An ANQP load indicator and/or an ANQP retry indicator may be included in each ANQP response.

In one embodiment, upon discovering an AP, a UE listens for an ANQP response transmitted by the AP in response to an ANQP query from another UE for a time period. If the UE receives an ANQP response within the time period, then the UE examines the ANQP response to determine whether the ANQP response includes network information needed by the UE to access a network via the AP. If the ANQP response includes the needed information, then the UE may proceed with authenticating to the network via the AP based on the information without sending its own ANQP query. Otherwise, the UE may continue listening for the time period. The ANQP response includes an ANQP load indicator and/or an ANQP retry indicator, which the UE stores in memory.

If the UE receives an ANQP response within the time period, but the ANQP does not include the information needed by the UE, then the UE may determine when to send an ANQP query to the AP based on the ANQP load indicator and/or ANQP retry indicator in the ANQP response.

If the ANQP load indicator is a binary indicator, the UE immediately sends an ANQP query when the binary indicator indicates a low ANQP load and backs off sending the ANQP query when the binary indicator indicates a high ANQP load. In this example, the binary indicator may be set by the AP before being transmitted in the ANQP response, in which the AP may set the binary indicator to indicate a high load when the ANQP load at the AP is above a threshold, and set the binary indicator to indicate a low load when the ANQP load at the AP is equal to or below a threshold.

If the ANQP load indicator is a load value, then the UE may compare the load value to a threshold. If the load value is equal to or below the threshold, then the UE immediately sends an ANQP query. If the load value is above the threshold, then the backs off sending the ANQP query. The threshold may be specified by a management object (e.g., Hotspot 2.0 management object) received by the UE from an operator and stored on the UE. This allows the operator to configure the threshold.

Thus, the ANQP load indicator enables an AP to cause UEs to back off sending ANQP queries when the ANQP load is high. This allows the AP to protect itself from excessive ANQP traffic.

If the UE determines to back off sending an ANQP query based on the ANQP load indicator, then the UE may determine a backoff time period based on the ANQP retry indicator. The UE may wait for the backoff time period before sending an ANQP query.

If the ANQP retry indicator is a timer value, then the UE may set a timer based on the timer value and send the ANQP query when the timer expires. If the ANQP retry indicator is a seed value, then the UE may input the seed value into an algorithm to calculate a timer value and set the timer according to the calculated timer value. For example, the algorithm may implement a hash function, and the seed value and a mobile identification (ID) of the UE may be input into the hash function to calculate the timer value. The mobile ID may be a media access control (MAC) address or another type of mobile ID that uniquely identifies the UE or a group of UEs.

Inputting the mobile ID into the hash function ensures that different UEs calculate different timer values (when each mobile ID uniquely identifies a UE) or different groups of UEs calculate different timer values (when each mobile ID uniquely identifies a group of UEs). The different timer values prevent too many UEs from attempting to send ANQP queries to the AP at the same time. Other algorithms may be adopted to calculate the timer value.

In one embodiment, if a UE determines to back off sending an ANQP query for a backoff time period, then the UE may continue to listen for an ANQP response transmitted by the AP in response to an ANQP query from another UE during the backoff time period. If the UE receives an ANQP response within the backoff time period, then the UE examines the ANQP response to determine whether the ANQP response includes network information needed by the UE to access a network via the AP. If the ANQP response includes the needed information, then the UE may proceed with authenticating to the network via the AP based on the information without sending its own ANQP query. In this case, the UE does not send an ANQP query at the end of the backoff time period since the UE has the information it needs. The UE may receive the ANQP response within the backoff time period, for example, when the ANQP response is transmitted by the AP in response to an ANQP query from another UE with a shorter backoff time period.

In one embodiment, when the ANQP load indicator indicates that the ANQP load is high, the UE may select another available AP and listen for an ANQP response transmitted by the other available AP in response to an ANQP query from another UE. Thus, the UE may treat the high ANQP load indication as an indication to try another available AP that potentially has a lower ANQP load. Some or all of the steps for controlling ANQP load discussed above may be carried out for the other available AP.

As discussed above, Hotspot 2.0 allows device authentication to a network to be carried out seamlessly with no input required by the user. Typically, a UE that is active (e.g., WiFi active) automatically attempts to connect to a network whenever the mobile discovers a hotspot. In some cases, this can cause too many UEs to attempt authentication at approximately the same time. This has the potential to cause network nodes that are involved in authentication (e.g., AAA server, AC, etc.) not to function correctly and consequently block or deny access to legitimate authentication requests from other UEs.

Accordingly, embodiments of the present disclosure provide solutions for controlling the authentication load. In one embodiment, a network entity provides an authentication load indicator indicating an authentication load. The network entity may include one network node (e.g., an AAA server, an AC, etc.) or multiple network nodes that cooperate to perform authentication for a network (e.g., service provider network). The authentication process may involve the network entity receiving credentials from the UE, and checking the received credentials against a database to verify the credentials. The authentication process may also involve the transport of security material including keys between the network entity and the UE and the use of the security material to establish a secure connection between the UE and the network.

The network entity may calculate the authentication load, for example, based on a number of UEs attempting to authenticate to the network entity. The authentication load indicator may be a binary indicator (e.g., in which a one indicates a high load and a zero indicates a low load). Alternatively, the authentication load may be a load value (e.g., a value between one and ten). The network entity may also provide an authentication retry indicator indicating how long a UE is to back off attempting to authenticate when the authentication load is high.

In some embodiments, the authentication load indicator can be generic to an AP (i.e., not tied to a specific service provider). In these embodiments, the AP may provide the authentication load indicator if it intends to control the load of a local AAA server or the AC/TWAG. In some embodiments, the authentication load indicator can be specific to a particular service provider or PLMN. In these embodiments, the authentication load indicator may be delivered to a UE together with an indication of the service provider or PLMN to which it applies. In some embodiments, both types of authentication load indicators may be delivered to a UE.

In one embodiment, an AP may broadcast an authentication load indicator and/or an authentication retry indicator to UEs by including these indicators in an ANQP response. This allows a UE to receive the authentication load indicator and/or authentication retry indicator by listening for an ANQP response that is transmitted in response to an ANQP query from another UE. A UE may also receive the authentication load indicator and/or authentication retry indicator by sending an ANQP query to the AP and receiving an ANQP response in response to the ANQP query. For an authentication load indicator and/or authentication retry indicator that are specific to a particular service provider, the ANQP response may include an indication of the service provider.

When a UE receives an authentication load indicator, the UE determines whether to immediately attempt authentication based on the authentication load indicator. If the authentication load indicator is a binary indicator (e.g., in which a one indicates a high load and a zero indicates a low load), the UE immediately attempts authentication when the binary indicator indicates a low load. The UE may attempt authentication using extensible authentication protocol (EAP) authentication or another form of authentication. The UE may initiate the authentication by sending an authentication request to the network entity. The UE backs off attempting authentication when the binary indicator indicates a high load. This applies to both authentication load indicators generic to APs or specific to particular service providers/PLMNs.

If the authentication load indicator is a load value, then the UE may compare the load value to a threshold. If the load value is equal to or below the threshold, then the UE immediately attempts authentication. If the load value is above the threshold, then the mobile station backs off attempting authentication. This applies to both authentication load indicators generic to APs or specific to particular service providers/PLMNs. The threshold may be specified by a management object (e.g., Hotspot 2.0 management object) received by the UE from an operator and stored on the UE. This allows the operator to configure the threshold.

Thus, the authentication load indicator enables a network entity to cause UEs to back off attempting authentication when the authentication load is high, and therefore to reduce the number of authentication requests.

If a UE determines to back off attempting authentication based on the authentication load indicator, then the UE may determine a backoff time period based on the authentication retry indicator. The UE may wait for the backoff time period before attempting authentication.

If the authentication retry indicator is a timer value, then the UE may set a timer based on the timer value, and attempt authentication when the timer expires. If the authentication retry indicator is a seed value, then the UE may input the seed value into an algorithm to calculate a timer value and set the timer according to the calculated timer value. For example, the algorithm may implement a hash function, and the seed value and a mobile ID of the UE may be input into the hash function to calculate the timer value. The mobile ID may be a media access control (MAC) address or another type of mobile ID that uniquely identifies the UE or a group of UEs.

Inputting the mobile ID into the hash function ensures that different UEs calculate different timer values (when each mobile ID uniquely identifies a UE) or different groups of UEs calculate different timer values (when each mobile ID uniquely identifies a group of UEs). The different timer values prevent too many UEs from attempting authentication at the same time. Other algorithms may be adopted to calculate the timer value.

As discussed above, authentication load indicators may be specific to particular service providers. In this case, an AP may transmit two or more authentication load indicators, in which each load indicator is specific to a different service provider. For each authentication load indicator, the AP may also transmit an indication of the respective service provider. The AP may receive each authentication load indicator from a network entity (e.g. an AAA server) handling authentication for the respective service provider. The authentication load indicators for different service providers may be different depending on the loads at the respective network entities.

When a UE receives authentication load indicators specific to different service providers, the UE may determine which of the authentication load indicators correspond to service providers for which the UE has credentials. For each of these authentication load indicators, the UE may examine each authentication load indicator to determine whether the authentication load for the corresponding service provider is high. For example, if one of the authentication load indicators indicates a high load and another one of the authentication load indicators indicates a low load, then the UE may select the service provider corresponding to the authentication load indicator indicating the low load for authentication.

If both authentication load indicators indicate a low load, then the mobile station may select the corresponding service provider with the highest priority.

In one embodiment, when the authentication load indicator indicates that the authentication load is high, the UE may select another available AP and receive an authentication load indicator from the other available AP (e.g., by listening for an ANQP response including an authentication load indicator from the other available AP). Thus, the UE may treat the high authentication load indication as an indication to try another available AP that potentially has a lower authentication load. Some or all of the steps for controlling authentication load discussed above may be carried out for the other available AP.

In some cases, when two APs provide access to the same service provider, the authentication load indicator for the service provider may be the same for both APs. This is because both AP may connect to the same network entity (e.g., AAA server, AC, etc.) to perform the authentication. Thus, when a UE receives an authentication load indicator from one of the APs for the service provider indicating a high load, the UE may assume that an authentication load indicator from the other AP for the same service provider will also indicate a high load. In this case, the UE may choose not to immediately try the other AP, and back off an attempt to authenticate. After the backoff time period, the UE may attempt authentication using either AP. In this example, the UE may store information indicating that both APs connect to the same network entity to perform authentication for the service provider.

In some embodiments, when a UE attempts to authenticate to a network entity (e.g., AAA server, AC, etc.), the network entity performs the authentication and then indicates to the UE whether to backoff connecting to the corresponding network or AP. For example, the network entity may determine the load of the network by monitoring the control and/or data traffic of the corresponding network and indicate to the UE to backoff from connecting to the network when the network load is high. In another example, the network entity may determine the load of the corresponding AP by monitoring the control and/or data traffic of the AP and indicate to the UE to backoff from connecting to the AP when the load is high. In this case, the network entity may include the AP.

The network entity may indicate to the UE whether to backoff after the UE and the network entity have authenticated each other (e.g., using EAP authentication). This enables the UE to confirm the identity of the network entity, and therefore to trust a backoff indication from the network entity. In other words, the network entity is able to indicate to the UE, in a secure way, to backoff from connecting to the corresponding network or AP when the corresponding load is high. This added security makes it more difficult for a malicious user to transmit a fake backoff indication to prevent legitimate authentication requests from other users.

In one embodiment, the network entity may authenticate the UE using EAP authentication. The authentication process may involve the generation and transport of cryptographic keys between the network entity and the UE and the use of these keys to establish a secure connection between the network entity and the UE. After the EAP authentication has succeeded, the network entity may indicate to the UE whether to back off connecting to the corresponding network or AP.

In one embodiment, the network entity may include a Remote Authentication Dial In User Service (RADIUS) server. If the network entity determines that the UE should back off from connecting to the corresponding network or AP (e.g., due to high load), then the RADIUS server may send a backoff indication to the corresponding AP in RADIUS messages. The AP may then deliver the backoff indication to the UE in a WNM-Notification frame that is robust since it is protected by the keys generated during the EAP authentication.

In one embodiment, if the network or AP load is high, the network entity may fail EAP authentication at the end of the authentication process, and notify the UE of the failure. The network entity may do this after the transport of security material including keys between the network entity and the UE so that the failure notification is secure. The failure notification may include an error code indicating to the UE to back off connecting to the corresponding network or AP.

When the network entity sends a backoff indication to the UE, the backoff indication may include a timer value. The UE may make another attempt to connect to the network or the AP after a timer set to the timer value expires. Alternatively, when the UE receives a backoff indication, the UE may wait for a time period before making another attempt to connect to the network or the AP, in which the time period is configured in the UE.

When the UE makes a second attempt to connect to the network or AP, the network entity may use security material (e.g., keys) generated during the authentication process for the first attempt to speed up the authentication process for the second attempt. For example, when the UE makes a first attempt to connect to the network or AP, the network entity may perform a full authentication. The full authentication may involve the generation and transport of security material (e.g., keys) between the network entity and the UE. When the UE makes a second attempt to connect to the network or AP (e.g., after backing off), the network entity may perform a fast re-authentication using the security material generated during the full authentication. The keys generated during the full authentication may be valid for a certain time period (e.g., a few hours), in which case the fast re-authentication may be performed within this time period after the full authentication.

The methodologies for controlling ANQP load and controlling authentication load according to various embodiments may be combined. For example, a UE may first perform the methodology for controlling ANQP load according to various embodiments. Once the UE obtains the information it needs to authenticate to a network via an AP (e.g., from an ANQP response), the UE may proceed with performing the methodology for controlling authentication load according to various embodiments. For example, once the UE obtains the needed information from an ANQP response transmitted in response to an ANQP query from the UE or another UE, the UE may determine whether to immediately attempt authentication or wait before attempting authentication based on an authentication load indicator in the ANQP response.

By way of example, methodologies that may be implemented in accordance with the disclosed subject matter may be better appreciated with reference to various flow charts. For purposes of simplicity of explanation, methodologies are shown and described as a series of acts/operations. However, the claimed subject matter is not limited by the number or order of operations, as some operations may occur in different orders and/or at substantially the same time with other operations from what is depicted and described herein. Moreover, not all illustrated operations may be required to implement methodologies described herein. It is to be appreciated that functionality associated with operations may be implemented by software, hardware, a combination thereof or any other suitable means (e.g., device, system, process, or component). Additionally, it should be further appreciated that methodologies disclosed throughout this specification are capable of being stored as encoded instructions and/or data on an article of manufacture to facilitate transporting and transferring such methodologies to various devices. Those skilled in the art will understand and appreciate that a method could alternatively be represented as a series of interrelated states or events, such as in a state diagram.

Figure 3A:
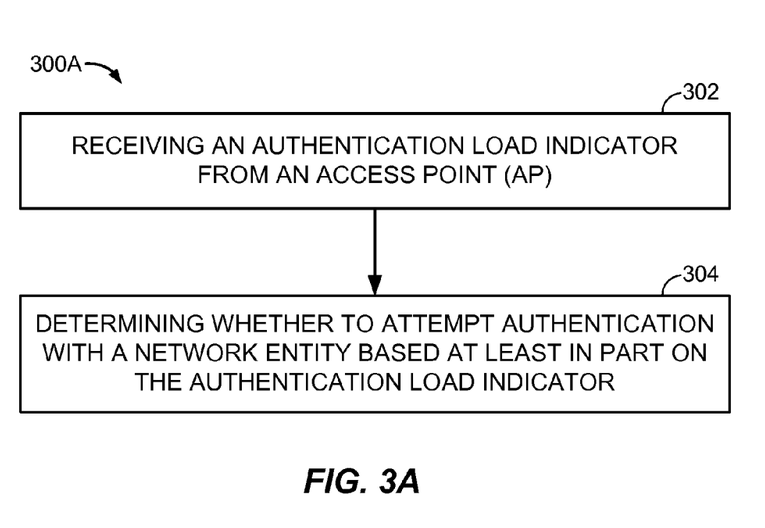
FIGS. 3A and 3B illustrate embodiments of a methodology that may be performed by a UE according to embodiments of the present disclosure.

FIG. 3A illustrates a method 300A that may be performed by a UE for controlling authentication load in a network. Method 300A may include, at 302, receiving an authentication load indicator from an access point (AP). For example, the UE may receive the authentication load in an ANQP response that is transmitted by the AP in response to an ANQP query from the UE or another UE. The method 300A may further include, at 304, determining whether to attempt authentication with a network entity based at least in part on the authentication load indicator.

Figure 3B:
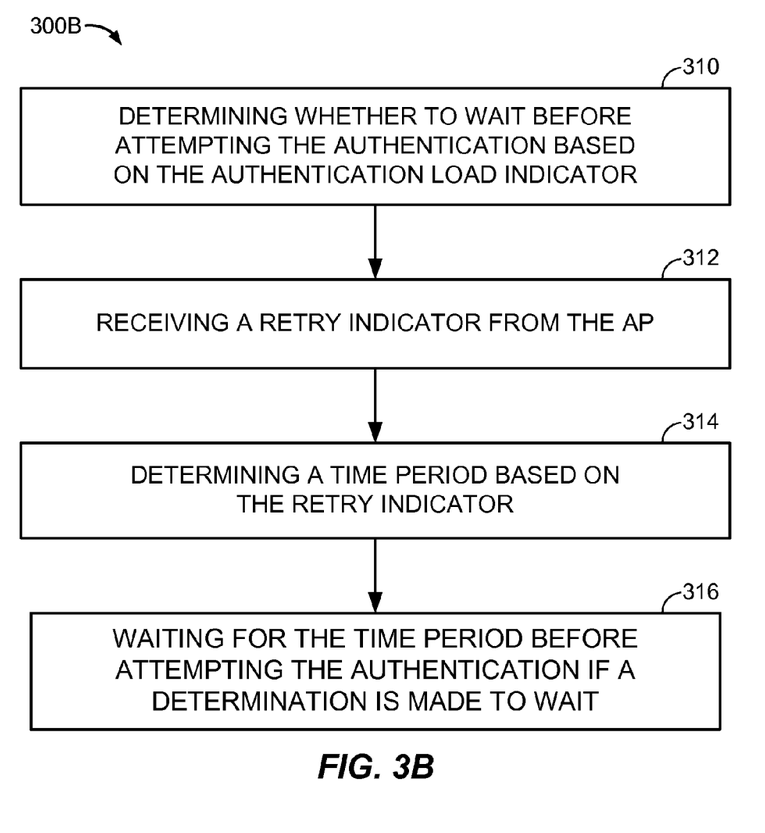

Additional operations 300B for controlling authentication load are illustrated in FIG. 3B. One or more of the operations 300B in FIG. 3B may optionally be performed as part of method 300A. Referring to FIG. 3B, the additional operations 300B may include, at 310, determining whether to wait before attempting the authentication based on the authentication load indicator. For example, the UE may determine to wait (back off) before attempting the authentication if the authentication load indicator is above a threshold. The additional operations 300B may also include, at 312, receiving a retry indicator from the AP, and, at 314, determining a time period based on the retry indicator. The additional operations 300B may further comprise, at 316, waiting for the time period before attempting the authentication if a determination is made to wait.

Figure 4A:
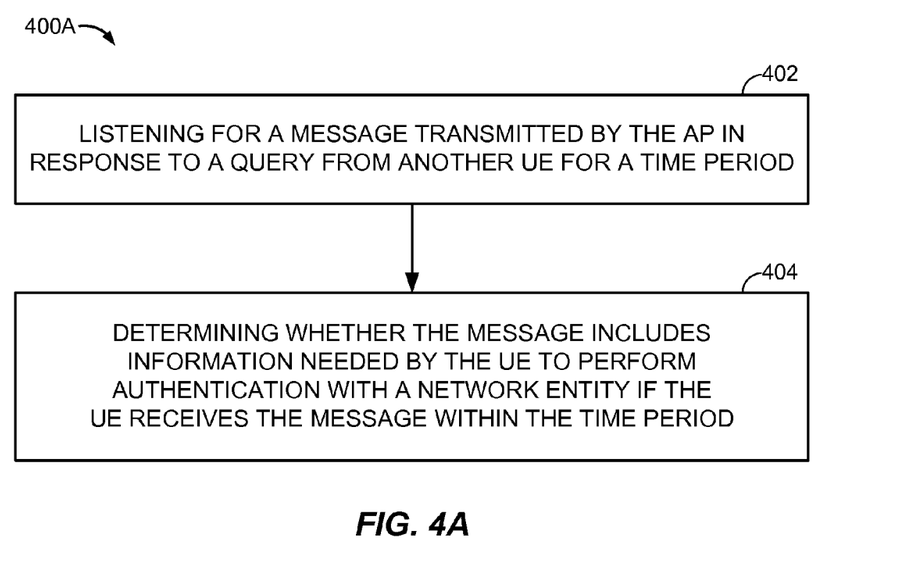
FIGS. 4A and 4B illustrate embodiments of a methodology that may be performed by an AP according to embodiments of the present disclosure.

FIG. 4A illustrates a method 400A that may be performed by a UE for controlling a load at an AP (e.g., ANQP load). Method 400A may include, at 402, listening for a message transmitted by the AP in response to a query from another UE for a time period. For example, the UE may listen for an ANQP response transmitted by the AP in response to an ANQP query from another UE. The method 400A may further include, at 404, determining whether the message includes information needed by the UE to perform authentication with a network entity if the UE receives the message within the time period. For example, the needed information may include whether the AP supports a service provider for which the UE has authentication credentials.

Figure 4B:
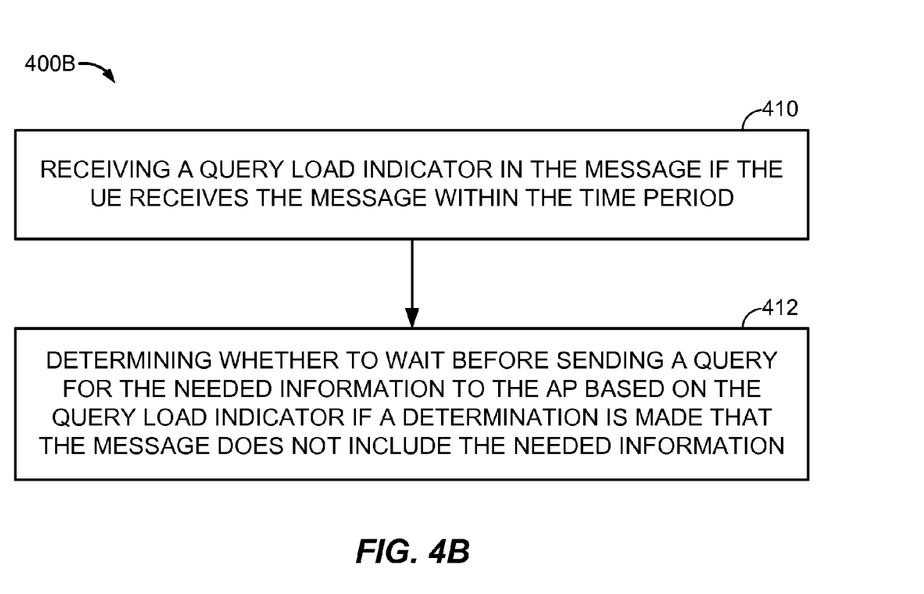

Additional operations 400B for controlling the load at the AP are illustrated in FIG. 4B. One or more of the operations 400B in FIG. 4B may optionally be performed as part of method 400A. Referring to FIG. 4B, the additional operations 400B may include, at 410, receiving a query load indicator in the message if the UE receives the message within the time period. For example, the query load indicator may be an ANQP load indicator. The additional operations 400B may also include, at 412, determining whether to wait before sending a query for the needed information to the AP based on the query load indicator if a determination is made that the message does not include the needed information. For example, the UE may determine to wait before sending the query if the query load indicator is above a threshold, and determine to immediately send the query if the query load indicator is below the threshold.

Figure 5A:
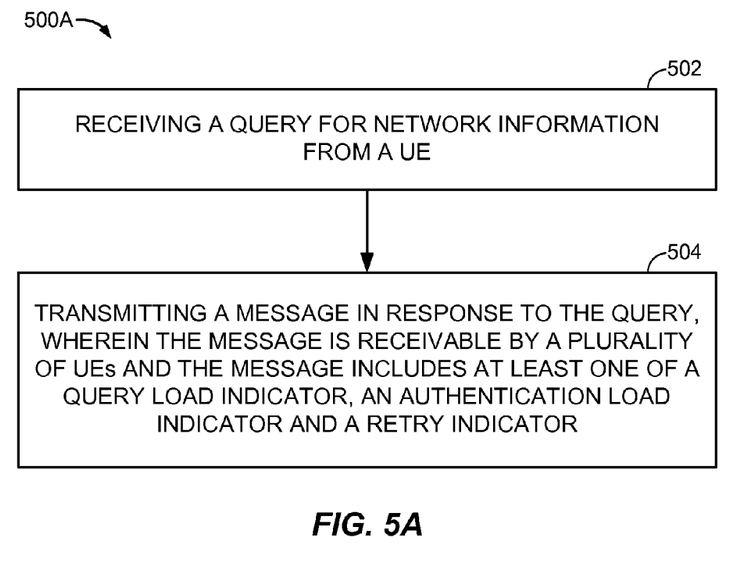
FIGS. 5A and 5B illustrate embodiments of a methodology that may be performed by a network entity according to embodiments of the present disclosure.

FIG. 5A illustrates a method 500A that may be performed by a network entity for managing a load. Method 500A may include, at 502, receiving a query for network information from a UE. For example, the query may be an ANQP query. The method 500A may further include, at 504, transmitting a message in response to the query, wherein the message is receivable by a plurality of UEs and the message includes at least one of a query load indicator, an authentication indicator and a retry indicator. For example, the message may be transmitted on a common channel shared by the plurality of UEs.

Figure 5B:
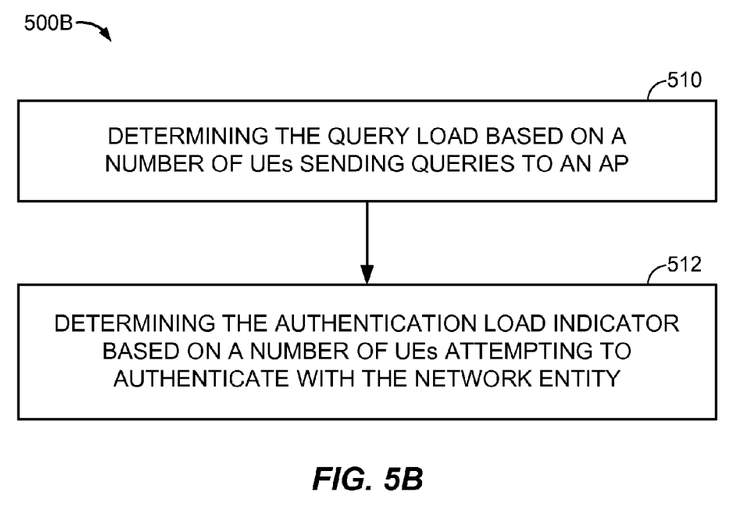

Additional operations 500B that may optionally be performed as part of method 500A are illustrated in FIG. 5B. Referring to FIG. 5B, the additional operations 500B may include, at 510, determining the query load indicator based on a number of UEs sending queries for network information to an AP. For example, the query load indicator may be based on a number of UEs sending ANQP queries to the AP. The additional operations 500B may also include, at 512, determining the authentication load indicator based on a number of UEs attempting to authenticate with the network entity.

Figure 6:
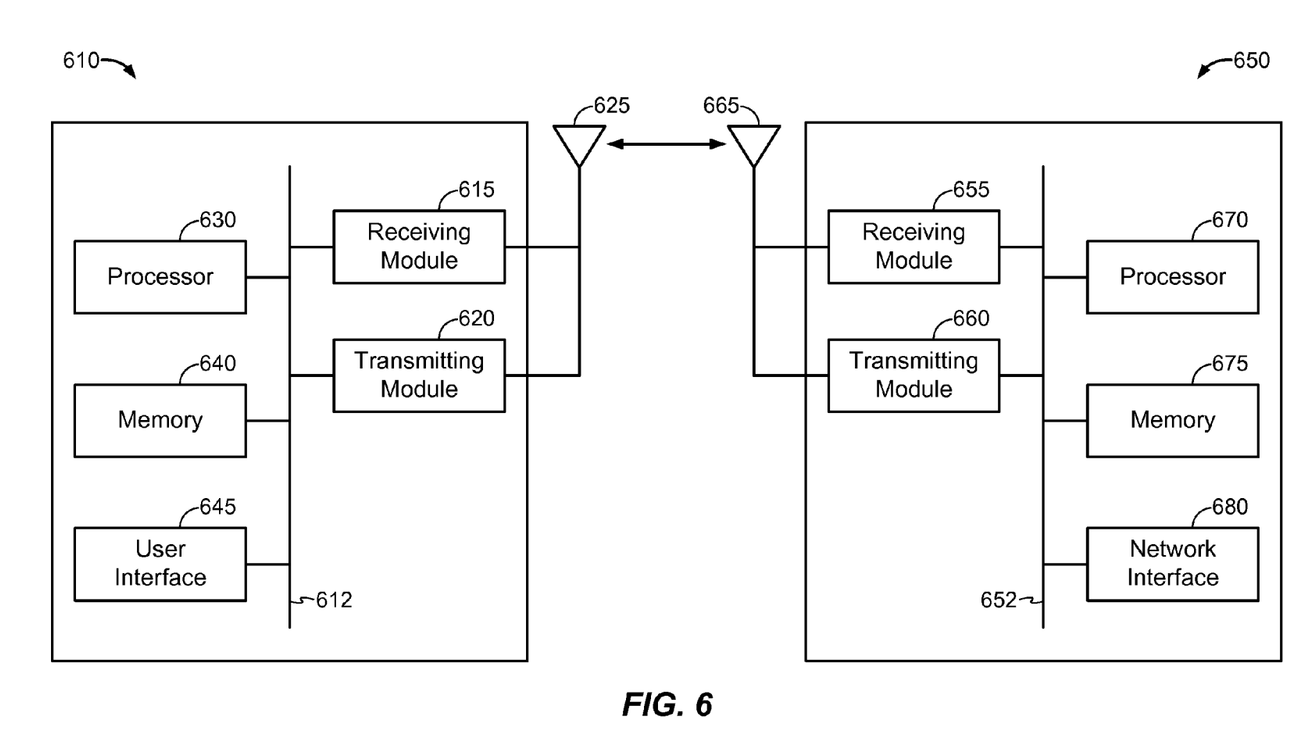
FIG. 6 is a block diagram illustrating a UE and an AP that may be configured to implement various embodiments of the present disclosure.

FIG. 6 is a block diagram illustrating a UE 610 and an AP 650 that may be configured to implement various embodiments of the present disclosure. The UE 610 may also be referred to as an access terminal, a mobile station, a subscriber unit, etc. The UE 610 may be a cellular phone, a personal digital assistant (PDA), a wireless modem, a wireless communication device, a handheld device, a laptop computer, a tablet, or another mobile device.

The UE 610 comprises a receiving module 615, a transmitting module 620, and one or more antennas 625 for wirelessly communicating with an AP (e.g., AP 650). The receiving module 615 may be configured to receive transmissions from APs via the antenna 625 using one or more wireless technologies. For example, the receiving module 615 may be a dual-mode receiving module capable of receiving cellular-based transmissions and WiFi transmission or a WiFi-only receiving module. The receiving module 615 may include front-end RF circuitry (e.g., LNAs, down-converters, equalizers, etc.), a demodulator, and/or DSP, etc. for receiving control and/or data signals over one or more wireless channels (e.g., from the AP 650). In one embodiment, the receiving module 615 may include a multiple-input multiple-out (MIMO) processor for processing MIMO signals (e.g., to support WiFi technology based on an IEEE 802.11n standard). In this embodiment, the UE 610 comprises multiple antennas.

The transmitting module 620 may be configured to transmit control and/or data signals to APs via the antenna 625 using one or more wireless technologies (e.g., WiFi, cellular-based technology, etc). The transmitting module 620 may include front-end RF circuitry (e.g., power amplifiers, up-converters, etc.), a modulator, and/or DSP, etc.

The UE 610 also comprises a processor 630 and a memory 640. The processor 630 is operably coupled to the receiving module 615, the transmitting module 620 and the memory 640 via a bus system 612. The bus system 612 may include one or more buses and/or other structures for communicating signals between various components of the UE 610.

The processor 630 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 630 may receive control and/or data signals (e.g., ANQP response, security material, etc.) from an AP via the receiving module 615, and may transmit control and/or data signals (e.g., ANQP query, authentication credentials, etc.) to an AP via the transmitting module 620.

The memory 640 may include RAM memory, flash memory, ROM memory, EPROM memory, EEPROM memory, registers, hard disk, a removable disk, a CD-ROM, or any combination thereof. The memory 640 may store computer-readable code that can be executed by the processor 630 to perform operations according to various embodiments of the present disclosure described herein. The memory 640 may store parameters for use by the processor 630 including load indicators, thresholds, retry values, authentication credentials, etc.

The UE 610 may also comprise a user interface 645 for interfacing the processor 630 with a user. The user interface 645 may include a display, a touch screen, a keypad or any combination thereof. Operations according to various embodiment of the present disclosure may be performed automatically by the UE 610 without explicit user input from the user interface 645.

The UE 610 may perform operations described herein according to various embodiments. For example, the memory 640 may store computer-readable code that, when executed by the processor 630, causes the processor 630 to perform one or more operations of methods 300A and 400A.

The UE 610 may perform method 300A. For example, the receiving module 615 may perform operation 302 of receiving an authentication load indicator from an AP (e.g., AP 650). The processor 630 may receive the authentication load indicator from the receiving module 615 via the bus system 612, and may perform operation 304 of determining whether to attempt authentication based at least in part on the authentication load indicator. The receiving module 615 may also perform optional operation 312 of receiving a retry indicator from the AP, and the processor 630 may perform optional operations 310, 314 and 316 using the retry indicator received by the receiving module 615.

The UE 610 may also perform method 400A. For example, the receiving module 615 may perform operation 402 of listening for a message transmitted by an AP in response to a query from another UE for a time period, and the processor 630 may perform operation 404 of determining whether the message includes information needed by the UE if the UE receives the message within the time period. The receiving module 615 may also perform optional operation 410 of receiving a query load indicator, and the processor 630 may perform optional operation 412 using the query load indicator received by the receiving module 615.

The AP 650 comprises a receiving module 655, a transmitting module 660, and one or more antennas 665 for wirelessly communicating with one or more UEs (e.g., UE 610). The receiving module 655 may be configured to receive transmissions from one or more UEs via the antenna 665 using one or more wireless technologies (e.g., WiFi). The receiving module 655 may receive transmissions from multiple UEs over multiple wireless channels to provide multiple wireless access to the UEs. The transmitting module 660 may be configured to transmit control and/or data signals to one or more UEs via the antenna 665 using one or more wireless technologies (e.g., WiFi). The transmitting module 660 may transmit control and/or data signals to multiple UEs over multiple wireless channels to provide multiple wireless access to the UEs. The transmitting module 660 may also transmit a signal (e.g., an ANQP response) on a common channel so that multiple UEs can receive the signal. Transmitting on a common channel may also be referred to as broadcasting.

The AP 650 also comprises a processor 670 and a memory 675. The processor 670 is operably coupled to the receiving module 655, the transmitting module 660 and the memory 675 via a bus system 652. The bus system 652 may include one or more buses and/or other structures for communicating signals between various components of the AP 650.

The processor 670 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The processor 670 may receive control and/or data signals (e.g., ANQP queries, authentication credentials, etc.) from UEs via the receiving module 655, and may transmit control and/or data signals (e.g., ANQP responses, security material, etc.) to UEs via the transmitting module 660.

The memory 675 may include RAM memory, flash memory, ROM memory, EPROM memory, EEPROM memory, registers, hard disk, a removable disk, a CD-ROM, or any combination thereof. The memory 675 may store computer-readable code that can be executed by the processor 670 to perform operations according to various embodiments of the present disclosure described herein.

The AP 650 also comprises a network interface 680 for connecting the AP 650 to one or more network nodes (e.g., an AC, a gateway, AAA server, etc.) in a network. The network interface 680 may be configured to connect the AP 650 to one or more network nodes via one or more wired connections (e.g., Ethernet connection, cable, digital subscriber line (DSL), etc.). The AP 650 may provide a UE with access to one or more network nodes through the network interface. For example, the processor 670 may use the network interface 680 to forward authentication credentials received from a UE to an AAA server and to forward security material (e.g., keys) received from the AAA server to the UE. The AP 650 may use the network interface 680 to provide the UE with network access when the UE is successfully authenticated to the network.

The AP 650 may perform operations described herein according to various embodiments. For example, the memory 675 may store computer-readable code that, when executed by the processor 670, causes the processor 670 to perform one or more operations of method 550A.

The AP 650 may perform method 500A. For example, the receiving module 655 may perform operation 502 of receiving a query for network information from a UE. In response to the query, the processor 675 and the transmitting module 660 may perform operation 504 by having the processor 630 generate the message and send the message to the transmitting module 660 for transmission. The processor 630 may also perform optional operations 510 and 512.

Alternatively, operations 510 and 512 may be performed by multiple cooperating network nodes (e.g., including the AP 650), in which performance of these operations in distributed among the cooperating network nodes. Each of the network nodes may comprise a network interface for communicating with the other network nodes, a processor, and a memory, where the memory may store computer-readable code that, when executed by the processor, causes the processor to perform one or more of the operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection may be properly termed a computer-readable medium to the extent involving non-transient storage of transmitted signals. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium, to the extent the signal is retained in the transmission chain on a storage medium or device memory for any non-transient length of time. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method performed by a user equipment (UE) for wireless communication, the method comprising:
   receiving, by the UE, an authentication load indicator from an access point (AP), the authentication load indicator indicates an amount of authentication traffic at a network entity; and
   determining, by the UE, to perform authentication with the network entity based at least in part on the authentication load indicator.

2. The method of claim 1, wherein determining, by the UE, to perform the authentication further comprises determining to wait for a time period before performing the authentication based on the authentication load indicator, the method further comprising:
   receiving a retry indicator from the AP;
   determining the time period based on the retry indicator; and
   waiting for the time period before performing the authentication.

3. The method of claim 2, wherein determining to wait before performing the authentication further comprises:
   comparing the authentication load indicator to a threshold; and
   determining to wait before performing the authentication when the authentication load indicator is above the threshold.

4. The method of claim 3, further comprising:
   receiving the threshold in a management object from an operator; and
   storing the threshold on the UE.

5. The method of claim 2, wherein determining the time period further comprises inputting the retry indicator and a mobile identification (ID) of the UE into a hash function.

6. The method of claim 5, wherein the mobile ID is a media access control (MAC) address of the UE.

7. The method of claim 1, further comprising:
listening for a message transmitted by the AP in response to a query from another UE for a time period, and
wherein receiving the authentication load indicator further comprises receiving the authentication load indicator in the message when the UE receives the message within the time period.

8. The method of claim 7, wherein the message is an Access Network Query Protocol (ANQP) response.

9. The method of claim 7, further comprising:
sending a query for network information to the AP when the UE does not receive the message within the time period, and
wherein receiving the authentication load indicator further comprises receiving the authentication load indicator in response to the query for network information.

10. The method of claim 9, wherein the query for network information is an Access Network Query Protocol (ANQP) query.

11. An apparatus for wireless communication comprising:
means for receiving, by the apparatus, an authentication load indicator from an access point (AP), the authentication load indicator indicates an amount of authentication traffic at a network entity; and
means for determining, by the apparatus, to perform authentication with the network entity based at least in part on the authentication load indicator.

12. An apparatus for wireless communication comprising:
a receiver configured to receive an authentication load indicator from an access point (AP), the authentication load indicator indicates an amount of authentication traffic at a network entity;
at least one processor configured to determine to perform authentication with the network entity based at least in part on the authentication load indicator; and
a memory coupled to the at least one processor for storing data.

13. A method performed by a user equipment (UE) for wireless communication, the method comprising:
listening, by the UE, for a message transmitted by an access point (AP) in response to a query from another UE for a first time period, the message transmitted by the AP includes at least one of an authentication load indicator or a retry indicator;
determining, by the UE, to perform authentication with a network entity based on at least one of the authentication load indicator or the retry indicator when the UE receives the message within the first time period; and
determining to wait before sending a query based on a query load indicator to the AP for an information needed by the UE to perform authentication with the network entity when the message does not include the needed information.

14. The method of claim 13, wherein the query load indicator is included in the message.

15. The method of claim 13, wherein the needed information indicates the AP supports a particular service provider or network for which the UE has authentication credentials.

16. The method of claim 13, wherein determining to wait before sending the query for the needed information further comprises:
determining to wait for a second time period before sending the query when the query load indicator is above a threshold; and
determining to send the query immediately when the query load indicator is below the threshold.

17. The method of claim 16, further comprising listening for at least one other message transmitted by the AP during the second time period when the query load indicator is above the threshold.

18. The method of claim 17, further comprising:
determining the at least one other message includes the needed information when the UE receives the other message within the second time period.

19. A method performed by a user equipment (UE) for wireless communication, the method comprising:
listening, by the UE, for a message transmitted by an access point (AP) in response to a query from another UE for a first time period, the message transmitted by the AP includes at least one of an authentication load indicator or a retry indicator;
determining, by the UE, to perform authentication with a network entity based on at least one of the authentication load indicator or the retry indicator when the UE receives the message within the first time period;
performing the authentication when the authentication load indicator is below a threshold; and
waiting for a second time period before performing the authentication when the authentication load indicator is above the threshold.

20. An apparatus for wireless communication comprising:
means for listening, by the apparatus, for a message transmitted by an access point (AP) to a user equipment (UE) in response to a query from the UE for a first time period, the message transmitted by the AP includes at least one of an authentication load indicator or a retry indicator;
means for determining to authenticate the apparatus with a network entity based on at least one of the authentication load indicator or the retry indicator when the apparatus receives the message within the first time period; and
means for determining to wait before sending a query based on a query load indicator to the AP for an information needed by the UE to perform authentication with the network entity when the message does not include the needed information.

21. An apparatus for wireless communication comprising:
a receiver configured to listen for a message transmitted by an access point (AP) to a UE in response to a query from the UE for a first time period, the message transmitted by the AP includes at least one of an authentication load indicator or a retry indicator;
at least one processor configured to:
determine the message includes information needed by the apparatus to perform authentication with a network entity when the apparatus receives the message within the first time period, and
determine to wait before sending a query based on a query load indicator to the AP for an information needed by the UE to perform authentication with the network entity when the message does not include the needed information; and
a memory coupled to the at least one processor for storing data.

22. A non-transitory computer-readable medium comprising code for causing a computer to:
receive an authentication load indicator from an access point (AP), the authentication load indicator indicates an amount of authentication traffic at a network entity; and determine to perform authentication with the network entity based at least in part on the authentication load indicator.

23. A non-transitory computer-readable medium comprising code for causing a computer to:
listen for a message transmitted by an access point (AP) in response to a query from a user equipment (UE) for a first time period; and
determine the message includes information needed by one other UE to perform authentication with a network entity when the one other UE receives the message within the first time period.

* * * * *